United States Patent
Patterson

(10) Patent No.: US 11,120,170 B2
(45) Date of Patent: Sep. 14, 2021

(54) SYSTEMS AND METHODS OF GENERATING A DYNAMIC REPRESENTATION OF AN ELECTRICAL GRID

(71) Applicant: Primate Technologies, Inc., Melbourne, FL (US)

(72) Inventor: Mitchell Patterson, Indian Harbour Beach, FL (US)

(73) Assignee: Primate Technologies, Inc., Melbourne, FL (US)

(*) Notice: Subject to any disclaimer, the term of this patent is extended or adjusted under 35 U.S.C. 154(b) by 344 days.

(21) Appl. No.: 16/400,424

(22) Filed: May 1, 2019

(65) Prior Publication Data

US 2020/0349233 A1  Nov. 5, 2020

(51) Int. Cl.
*G06F 17/50* (2006.01)
*G06F 30/00* (2020.01)
*G06F 1/3206* (2019.01)

(52) U.S. Cl.
CPC ............ *G06F 30/00* (2020.01); *G06F 1/3206* (2013.01)

(58) Field of Classification Search
CPC ........................................................ G06F 30/00
USPC ................................................................. 703/1
See application file for complete search history.

(56) References Cited

U.S. PATENT DOCUMENTS

| | | | |
|---|---|---|---|
| 5,544,067 A | 8/1996 | Rostoker et al. | |
| 5,867,399 A | 2/1999 | Rostoker et al. | |
| 5,991,522 A | 11/1999 | Shoen | |
| 6,314,194 B1 | 11/2001 | Michael et al. | |
| 6,684,372 B2 | 1/2004 | Tom et al. | |
| 6,996,295 B2 | 2/2006 | Tyan et al. | |
| 7,319,941 B1 | 1/2008 | Mukherjee et al. | |
| 7,810,025 B2 | 10/2010 | Blair et al. | |
| 8,117,537 B1 | 2/2012 | Vell et al. | |
| 8,155,943 B2 | 4/2012 | Nasle | |
| 9,165,100 B2 | 10/2015 | Begur et al. | |
| 9,177,094 B2 | 11/2015 | Zhao et al. | |
| 9,177,418 B1 | 11/2015 | Bawden et al. | |
| 9,600,610 B2 | 3/2017 | Tobe et al. | |
| 2004/0225487 A1 | 11/2004 | Iwakura et al. | |
| 2008/0109205 A1 | 5/2008 | Nasle | |
| 2009/0199147 A1 | 8/2009 | Jensen | |
| 2010/0250622 A1 | 9/2010 | Hossenlop | |

(Continued)

OTHER PUBLICATIONS

Pierron, Daniel,Designing a Robotic Complex for Power Line Diagnostics. (Year: 2015).*

*Primary Examiner* — Lechi Truong
(74) *Attorney, Agent, or Firm* — Daniel C. Pierron; Widerman Malek PL

(57) ABSTRACT

A computer-implemented method comprising receiving and parsing an electrical grid design file to define a plurality of grid objects comprising a power source and a plurality of power lines, generating a grid status data structure comprising a grid coordinate display and the pluralities of grid objects and power lines, assigning electrical properties to and defining location and connection coordinates for the grid objects, defining end coordinates for the power lines, defining electrical connections, associating sensors with the grid objects and power lines, identifying power sources for each grid object, receiving and updating sensor information, and generating and transmitting a display file responsive to the sensor information.

20 Claims, 6 Drawing Sheets

(56) References Cited

U.S. PATENT DOCUMENTS

| | | | |
|---|---|---|---|
| 2010/0295474 A1* | 11/2010 | Chemel | H05B 47/19 |
| | | | 315/294 |
| 2013/0166270 A1 | 6/2013 | Sun et al. | |
| 2018/0239144 A1* | 8/2018 | Woods | A63F 13/212 |
| 2020/0117900 A1* | 4/2020 | Deng | H04W 4/02 |

* cited by examiner

SYSTEMS AND METHODS OF GENERATING A DYNAMIC REPRESENTATION OF AN ELECTRICAL GRID

FIELD OF THE INVENTION

The present invention relates to systems and methods for generating a dynamic representation of an electrical grid.

BACKGROUND OF THE INVENTION

Current electrical grid system design development is a labor-intensive and repetitive process. Current computerized systems provide computer-aided manual drafting of each constituent element of an electrical grid, with the manual placement of each element and definition of electrical connections between adjacent elements. Such manual definition of electrical connections is time-consuming, slowing down the development process, labor-intensive, driving up development costs, and prone to human error, resulting in down-the-line issues with deployment of the electrical grid.

Moreover, maintaining an up-to-date status of an electrical grid is heavily dependent on the logical arrangement of the components of the grid, such that the status can be accurately depicted in a visual representation of the grid, particularly with regard to the present electrification status of the grid components, such that potential electrocution of individuals attempting to perform maintenance on the grid can be avoided. Creating the logical structure backing a digital representation of an electrical grid is currently a manual process, with the various electrical connections within the electrical grid being individually manually defined. Moreover, due to the fragmented nature of software for the design of electrical grids, proprietary file types are typically used by such software. Those proprietary file types are not compatible with other software for electrical grid design. While export into generic file types that are not specific to electrical grid design (for example, vector-based image files, such as SVGs) is a common functionality, this results in the loss of the logical framework defining the connections between the components of the electrical grid.

These issues result in project delays when incompatible software is used by various agents in electrical grid design and operation. Accordingly, there is a need in the art for a system that can facilitate the electrical grid design process by addressing heretofore unsolved issues in automated generation of files representing electrical grids, and for receiving and parsing image files representing an electrical grid and generating an electrical grid file therefrom.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a computer-implemented method of generating a dynamic representation of an electrical grid comprising receiving an electrical grid design file, parsing the electrical grid design file to define a plurality of grid objects comprising a power source and a plurality of power lines, generating a grid status data structure comprising a grid coordinate display, the plurality of grid objects, and the plurality of power lines, assigning electrical properties to each grid object of the plurality of grid objects, defining a location comprising location coordinates and a connection point comprising connection coordinates within the grid coordinate display for each grid object of the plurality of grid objects, defining a first end comprising first end coordinates and a second end comprising second end coordinates, collectively power line ends and end coordinates, within the grid coordinate display for each power line of the plurality of power lines, defining an electrical connection between grid objects having connection points comprising connection coordinates within a connecting distance threshold, between grid objects and power lines where connection coordinates of a connection point and one of the first end coordinates and the second end coordinates of the power line ends are within the connecting distance threshold, and between power lines wherein end coordinates of two or more power lines are within the connecting distance threshold, receiving association information operable to associate sensors of a plurality of sensors with at least one of a grid object of the plurality of grid objects or a power line of the plurality of power lines, identifying a power source associated with each grid object of the plurality of grid objects, receiving sensor information from the plurality of sensors, defining received sensor information, updating a status of each of the plurality of grid objects and the plurality of power lines responsive to the received sensor information, defining an updated grid status data structure, generating a display file responsive to the updated grid status data structure, the display file comprising a visual representation of at least a portion of the grid coordinate display, the plurality of grid objects, and the plurality of power lines, the display file being configured to be displayed on a display, and transmitting the display file to a display device.

In some embodiments, updating the status of each of the plurality of grid objects may comprise indicating whether each grid object of the plurality of grid objects is electrified, comprising identifying an unbroken path from an electrified power source to the grid object.

In some embodiments, the method may further comprise defining a power line route between the power line ends for each power line of the plurality of power lines, the power line route comprising information about occupancy of the power line in the grid coordinate display by the power line connecting the power line ends of the power line. The method may further comprise identifying a power line having a power line end that is not within the connecting distance threshold of one of a connection point of a grid object or a power line end of another power line, defining an unconnected power line end, identifying a power line route comprised by a power line of the plurality of power lines where the unconnected power line end is within the connecting distance threshold of the power line route, defining an identified power line route, and defining an electrical connection between the unconnected power line end and the identified power line route, thereby establishing an electrical connection between the respective power lines. In some embodiments, the unconnected power line end may be identified by generating a list of all power line ends and connection points comprised by the grid status data structure, defining a plurality of grid connection points, sequentially comparing each power line end to the grid connection point of the plurality of grid connection points to identify a grid connection point within the connecting distance threshold of the power line end, and for each power line end that is not within the connecting distance threshold, defining the power line end as an unconnected power line end.

In some embodiments, the method may further comprise identifying a connection point of a grid object that is within the connection distance threshold of connected power line ends of two power lines, breaking the connection between the power line ends of the two power lines, and defining an electrical connection between the connection point of the grid object and each of the power line ends of the two power lines.

In some embodiments, the method may further comprise, upon receiving unrecognizable sensor information from a sensor associated with a grid object, updating the status of the grid object associated with the sensor to indicate the grid object is electrified and to indicate receipt of the unrecognizable sensor information.

In some embodiments, the method may further comprise receiving sensor information from a sensor of the plurality of sensors associated with the power source indicating the power source is de-energized updating the status of each grid object of the plurality of grid objects responsive associated with the power source responsive to the de-energization of the power source. The method may further comprise defining a transfer switch comprised by the plurality of grid objects, the transfer switch being associated a first power source and a second power source and defining an orientation of the transfer switch such that the first power source is a primary power source for the transfer switch and the second power source is a secondary power source for the transfer switch. The method may further comprise defining a status of the transfer switch to indicate receiving power from the first power source, receiving sensor information from at least one of a sensor associated with the first power source and a sensor associated with the transfer switch indicating the first power source is de-energized, and updating the status of the transfer switch to indicate re-orientation of the transfer switch to receive power from the second power source.

In some embodiments, the electrical grid design file may be a scalable vector graphic file.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1A:
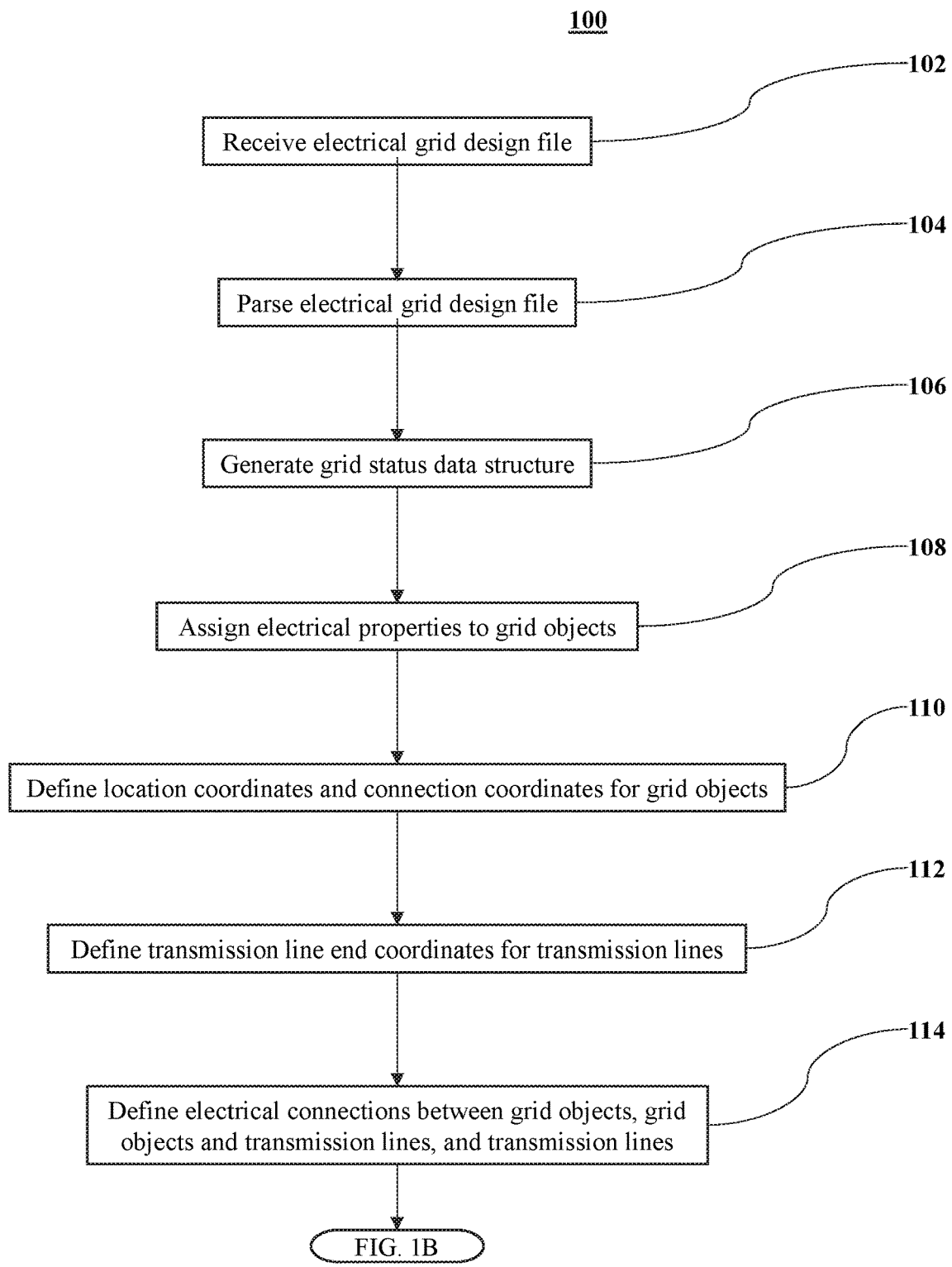
FIGS. 1A-B are flowcharts illustrating a method of generating a dynamic representation of an electrical grid according to an embodiment of the invention.
Figure 1B:
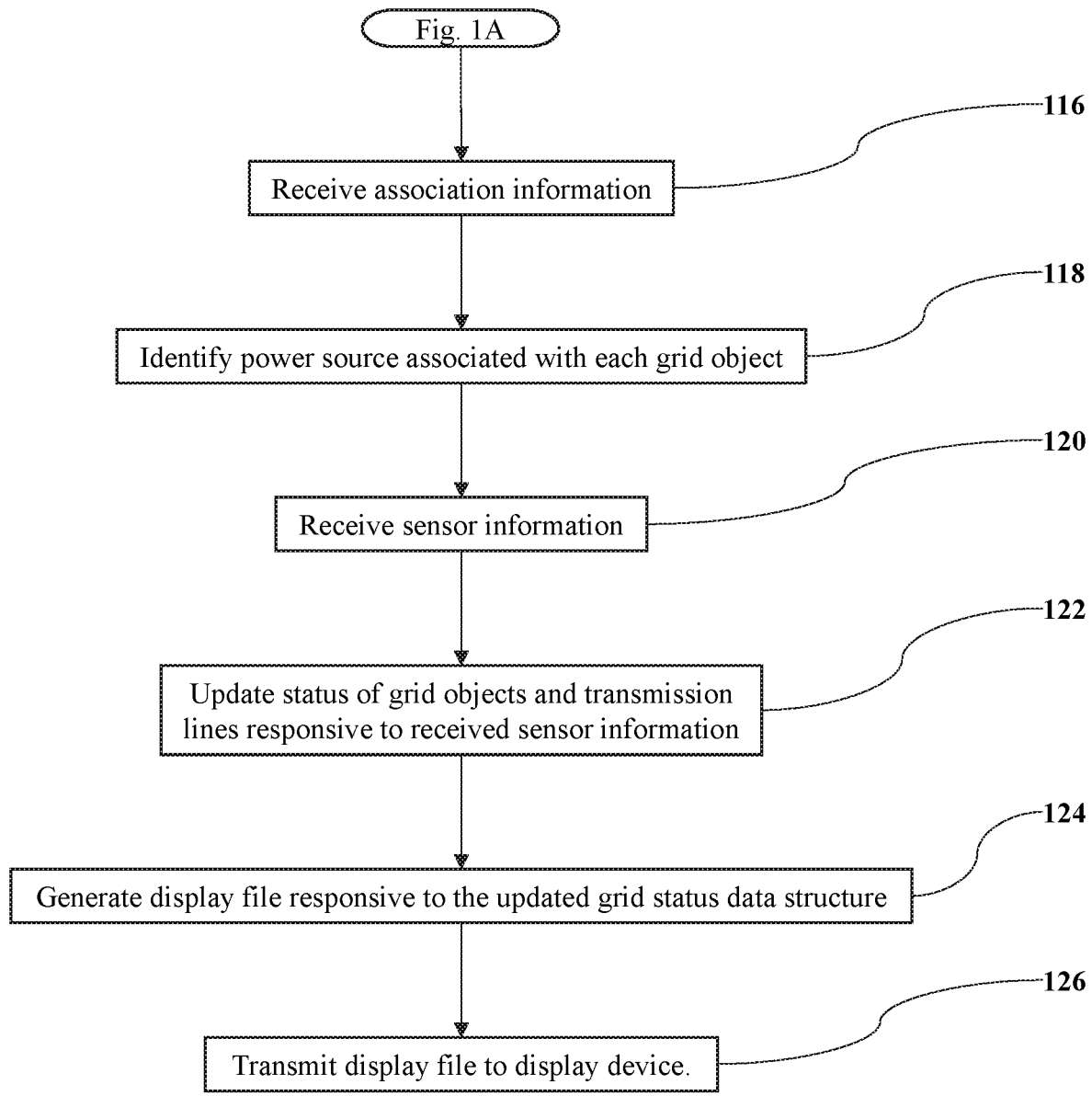

Referring now to FIGS. 1A-B, a flowchart illustrating a method 100 of generating a dynamic representation of an electrical grid according to an embodiment of the invention is presented. It is contemplated and included within the scope of the invention that the following steps may performed on a computing device comprising a processor, a memory, such as a non-volatile memory, in communication with the processor, and a communication device, such as a network interface card, in communication with the processor and operable to send and receive information across a network, including, but not limited to personal area networks (PANs), local area networks (LANs), and wide area networks (WANs), such as the Internet.

The method 100 may comprise receiving an electrical grid design file 102. The electrical grid design file may be a graphical representation of an electrical grid, including graphical representations of typical componentry. Such components include, but are not limited to, power lines, power sources, including voltage and current sources, transformers, grounds, loads, and the like. The electrical grid design file may be received as an image file, including, but not limited to, SVG files, PNG files, JPEG files, TIFF files, PDF files, PDN files, bitmap files, and the like. In some embodiments, the electrical grid design file may be received via the communication device. In some embodiments, the electrical grid design file may be received from a peripheral design in communication with the processor, such as an image capture device, including, but not limited to, a camera and/or a scanner.

The method 100 may continue with the processor parsing the electrical grid design file 105. The processor may be configured to identify the graphical representations of the various componentry comprised by the electrical grid and define a plurality of grid objects and a plurality of power lines. A grid object may be understood to represent a component of an electric grid (i.e. all components other than power lines) and a power line may be understood to represent a conductor operable to conduct electricity between grid objects. The plurality of grid objects defined from the electrical grid design file may include a power source. In some embodiments, the plurality of grid objects may comprise a plurality of power sources.

The method 100 may continue with the processor generating a grid status data structure 106. The grid status data structure may be a file that comprises all the characteristics of an electrical grid and may be stored on the memory. The grid status data structure may comprise a grid coordinate display, the plurality of grid objects generated at step 104, and the plurality of power lines generated at step 104. The grid coordinate display may be a two- or three-dimensional grid representation within which the electrical grid, namely, the grid objects and power lines, may be positioned. The grid coordinate display may comprise (x,y) or (x,y,z) location coordinates that serve to represent the electrical and/or geographical position of the electrical grid component represented by the grid objects and the power lines. Moreover, the grid coordinate display may be configured to enable its display on a display device. In some embodiments, the dimensions of the grid coordinate display may correspond to dimensions extracted or otherwise associated with the electrical grid design file. In other embodiments, the dimensions of the grid coordinate display may be determined responsive to the composition of the plurality of grid objects and the plurality of power lines.

The method 100 may continue with the processor assigning electrical properties to the grid objects comprised by the grid status data structure 108. The electrical properties assigned to the grid objects may be consistent with the component each grid object is associated with. Types of properties that may be assigned to grid objects may be minimum current, maximum current, minimum voltage, maximum voltage, minimum operating power, maximum operating power, average power consumption, minimum power generation, maximum power generation, average power generation, impedance, resistance, capacitance, phase, waveform, and the like.

The method 100 may continue with the processor defining a location for each grid object of the plurality of grid objects 110. Defining a location may comprise defining location coordinates within the grid coordinate display for each grid object. The location coordinates for each grid object may define a location of a center point of the grid object within the grid coordinate display or of any other reference point of the grid object. Defining a location for each grid object may further comprise defining a connection point for each grid object. A connection point may be understood as representing where the grid object may form an electrical connection with another element (i.e. grid object or power line) of the grid status data structure. Defining a connection point for a grid object may comprise defining connection coordinates for the connection point within the grid coordinate display. It is contemplated and included within the scope of the invention that a single grid object may comprise any number of connection points.

The method 100 may continue with the processor defining first and second ends, collectively power line ends, for each power line of the plurality of power lines comprised by the grid status data structure 112. Defining each the power line ends may comprise defining coordinates within the grid coordinate display for each end.

The method 100 may continue with the processor defining electrical connections between grid objects, grid objects and power lines, and power lines 114. More specifically, the processor may be configured to compare the coordinates of each grid object connection point and power line ends to determine whether there is another connection point or power line end within a connecting distance threshold. For example, two grid object connection points within the connecting distance threshold may have a connection established there between. In some embodiments, this may comprise updating an electrical property of each grid object to indicate the electrical connection established there between. In some embodiments, this may comprise changing the location of one or both of the grid objects such that the connection points within the connecting distance threshold are concentric, overlapping, or otherwise may be visually represented as being graphically connected, such graphical representation of connection indicating the connection points are electrically connected, and in some cases physically connected.

The connecting distance threshold may be a distance within the grid coordinate display between the respective connection points and power line ends. The distance may be measured as a direct distance between the points or a rectilinear distance. In some embodiments, the connecting distance threshold may be measured as a radius between the connection points and the power line ends, whereby connection points and power line ends within the connecting distance are associated with each other and defined as electrically connected.

Similarly, a grid object connection point and a power line end within the connecting distance threshold may have a connection established there between, such connection potentially comprising changing the electrical properties of the respective grid object and power line to reflect the connection and changing the location of one or both of the grid object or the power line, or in some embodiments not the power line in its entirety, but only the power line end, such that the connection point and the power line end are concentric, overlapping, or otherwise graphically representing the connection there between.

Additionally, two power line ends of respective power lines that are within the connecting distance threshold may have a connection defined there between, such connection potentially comprising changing the electrical properties of the power lines to reflect the connection and changing the location of one or both of the power lines, or in some embodiments only the power line ends, such that the power line ends are concentric, overlapping, or otherwise graphically representing the connection there between.

The method 100 may further comprise the communication device receiving association information. The association information may be operable to associate sensors of a plurality of sensors associated with the electrical grid to the pluralities of grid objects and power lines. More specifically, the association information may be operable to associate a sensor with a grid object or power line, with information provided by the sensor indicating a condition of the associated grid object or power line. Accordingly, the association information may be a mapping of sensors to grid objects and power lines. All types of sensors that may indicate conditions of grid objects and power lines are contemplated and included within the scope of the invention, including sensors operable to indicate electrification status, voltage, current, operating temperature, environmental conditions, and the like.

The method 100 may continue with the processor identifying a power source associated with each grid object of the plurality of grid objects comprised by the grid status data structure 118. A power source that is associated with a grid object may be operable to, under certain conditions, provide electrical power to the grid object. Upon identifying an associated power source, the electrical characteristics of the grid object may be updated to reflect such an association. In some embodiments, a single grid object may be associated with more than one power source. In some embodiments, the processor may identify every power source that, under certain conditions, may prove electrical power to the grid object, thereby associating the grid object with all of the identified power sources.

The method 100 may continue with the communication device receiving sensor information from the plurality of sensors 120. The information received from the plurality of sensors may be defined as received sensor information. The information received from the sensors may vary, depending on the type of sensor from which information is received and the electrical component the sensor is monitoring or associated with. In some embodiments, the sensor information may be received individually from each sensor. In some embodiments, the sensor information may be received in a batched power comprising sensor information from a plurality of sensors in a single power.

In some embodiments, sensor information from a sensor associated with a first grid object or power line may result in a change in the status of another grid status or power line. For example, if sensor information is received by the communication device from a sensor associated with a power source indicating the power source is de-energized, the processor may identify grid objects and power lines having only the power source associated with the received sensor information as a power source comprised by the grid status data structure and change the status of those identified grid objects and power lines to indicate they are de-energized. In some embodiments, the processor may further identify grid objects and power lines associated with both the associated power source and another power source, flagging those grid objects and power lines for additional review for energization status responsive to the de-energization of the associated power source.

The method 100 may continue with the processor updating the status of the plurality of grid objects and the plurality of power lines responsive to the received sensor information 122. Performance of this update may define an updated grid status data structure. Updating the status of the plurality of grid objects and plurality of power lines may provide an indication of the operational status of the electrical grid as of the time the received sensor information was received. Updating the status of the plurality of grid objects may comprise an indication of electrification status, voltage, current, phase, orientation, or other operational parameters.

In some embodiments, where the sensor transmits unrecognizable sensor information from a sensor associated with a grid object, the processor may update the status of the associated grid object to indicate the grid object is electrified and to indicate receipt of the unrecognizable sensor information. Such a default to indicate electrification may prevent the false indication of the grid object not being electrified when it is electrified, creating the potential for electrocution of an individual acting upon the mistaken understanding that the component associated with the grid object is not electrified.

The method 100 may continue with the processor generating a display file responsive to the updated grid status data structure 124. The display file may be configured to present a visual representation at least a portion of the plurality of grid objects and plurality of power lines, electrical characteristics thereof, and statuses thereof. Such visual representation may include depictions of electrical componentry comporting to electrical grid schematic practices, i.e. symbols representing particular electrical components. In some embodiments, the visual representation may follow a similar distribution of the plurality of grid objects and plurality of power lines as comprised by the electrical grid design file. Such a visual representation may facilitate the understanding of observers of the display file by taking advantage of the opportunity for familiarity with the layout of the electrical grid presented in the electrical grid design file. Additionally, the display file may employ visual elements to convey the status of the plurality of grid objects and plurality of power lines. Such visual elements may include use of color to indicate an operational status thereof. Further visual elements may include text to provide detailed information about the operational status thereof. The display file may be configured to be displayed on a display, as is known in the art. Furthermore, the display file may be configured such that an input received from a user input device associated with the display file may present additional information regarding the operational status thereof. For example, receiving a user input in a portion of the display that is co-located with the display of a grid object or power line may result in the depiction of a window presenting additional information regarding the operational status of the grid object or power line.

The method 100 may continue with the power of the display file to a display device 126. Such power may be accomplished by a display adapter device connected to the processor. The display adapter device may be configured to connect with a display via cable or any other power medium. In some embodiments, the display adapter device may be operable to render the display file into a format more suitable to the display, including changing the resolution, image size, color characteristics, and the like of the display file.

Figure 2:
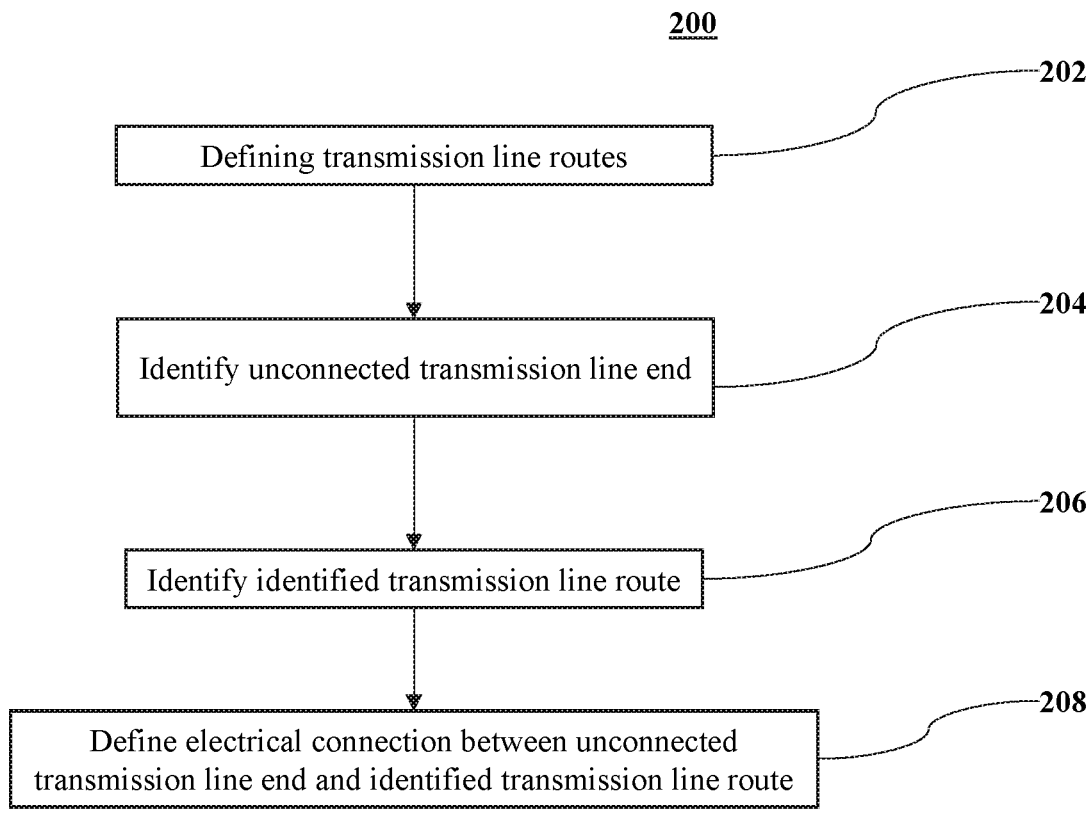
FIG. 2 is a flowchart illustrating a method of defining electrical connections between unconnected power line ends and mid-line power lines according to an embodiment of the invention.
Figure 3:
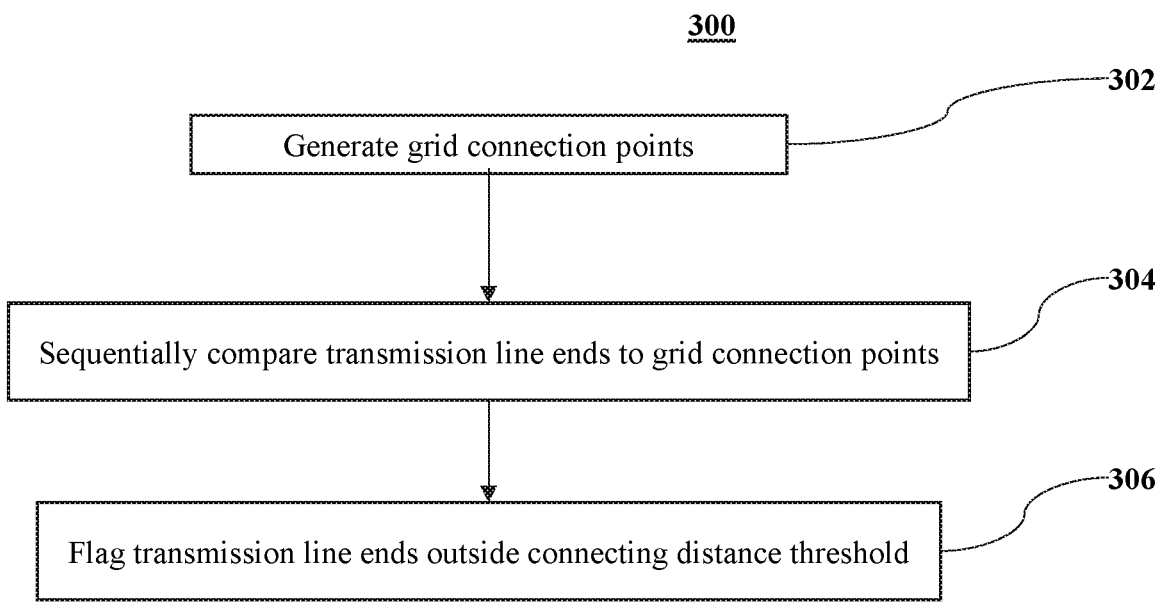
FIG. 3 is a flowchart illustrating a method of identifying unconnected power line ends in a representation of an electrical grid according to an embodiment of the invention.

Referring now to FIGS. 2 and 3, flowcharts illustrating methods 200, 300 of defining electrical connections between unconnected power line ends and mid-line power lines and of identifying unconnected power line ends in a representation of an electrical grid according to embodiments of the invention are presented. The method 200 may begin identifying, by the processor, a power line route comprised by a power line of the plurality of power lines 202. The power line route may comprise information about occupancy of the power line in the grid coordinate display by the power line, i.e. where the power line occupies part of the grid coordinate display. In some embodiments, the power line route may comprise a plurality of connection points at or within the connection distance threshold. In some embodiments, the power line route may be a vector defined between the power end lines, such that any point along the power line route may be determined by the processor. More specifically, the processor may be operable to determine whether a given location is within the connections distance threshold when comparing the coordinates of the location to the vector defining the power line route.

The method 200 may continue with identifying, by the processor, a power line having a power line end that is not within the connecting distance threshold of either of a connection point of a grid object or a power line end, defining unconnected power line ends 204. Identifying unconnected power line ends may be accomplished by performance of method 300, as will be described in detail below.

The method 200 may continue with identifying, by the processor, a power line route comprised by a power line of the plurality of power lines where the unconnected power line end is within the connecting distance threshold of the power line route, defining an identified power line route 206. This may be accomplished by comparing the coordinates of the unconnected power line ends to the power line route responsive to how the power line route is defined. Such comparisons include, but are not limited to, comparing the coordinates of the unconnected power line end to the coordinates of the plurality of connection points defining the power line route and to the vector defining the power line route to determine if the definition of the power line route falls within the connection distance threshold.

The method 200 may continue by defining, the processor, an electrical connection between the unconnected power line end and the identified power line route, thereby establishing an electrical connection between the respective power lines 208.

The method 300 of identifying unconnected power line ends in a representation of an electrical grid may comprise generating, by the processor, a list of all power line ends and connection points comprised by the grid status data structure, defining grid connection points 302. The list of grid connection points may be stored on the memory and comprise the coordinates of the grid connection points. The method 300 may continue with sequentially comparing, by the processor, each power line end to the grid connection points comprised by the list of grid connection points to identify a grid connection point within the connecting distance threshold of power line end 304. The method 300 may continue with flagging, by the processor, each power line end that is not within the connection distance threshold of a grid connection point. Such flagging may be accomplished by updating the characteristics of the power line end in the grid status data structure.

Figure 4:
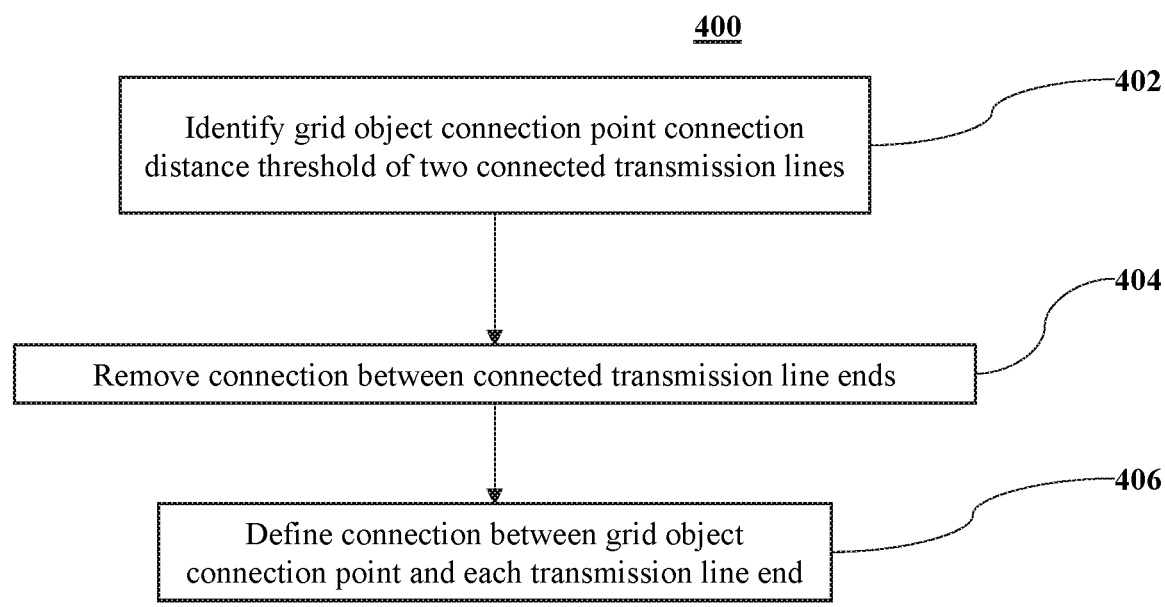
FIG. 4 is a flowchart illustrating a method of defining connections between a grid object and two power lines according to an embodiment of the invention.

Referring now to FIG. 4, a method 400 of defining connections between a grid object and two power lines according to an embodiment of the invention is illustrated. The method 400 may comprise identifying, by the processor, a connection point of a grid object that is within the connection distance threshold of two power line ends of two separate power lines 402. Such identification may be accomplished similar to identification of an unconnected power line, by comparing each power line end to the list of grid connection points to determine if a power line end and a connection point of a grid object are within the connection distance threshold. Alternatively, the identification may be accomplished by comparing a power line end that is connected to another power line end to the connection points of all grid objects to determine if a connection point of a grid object is within the connection distance threshold or comparing a connection point of a grid object to the power line ends to determine if two power line ends are within the connection distance threshold. As a result of the power line ends being within the connection distance threshold, the ends may have been connected with each other. In such scenarios, the method 400 may continue with removing, by the processor, the connection between the power line ends of the two power lines 404. This may be accomplished by updating the grid status data structure to reflect such disconnection. The method 400 may continue with defining, by the processor, an electrical connection between the connection point of the grid object and each of the power line ends of the two power lines in the grid status data structure.

Figure 5:
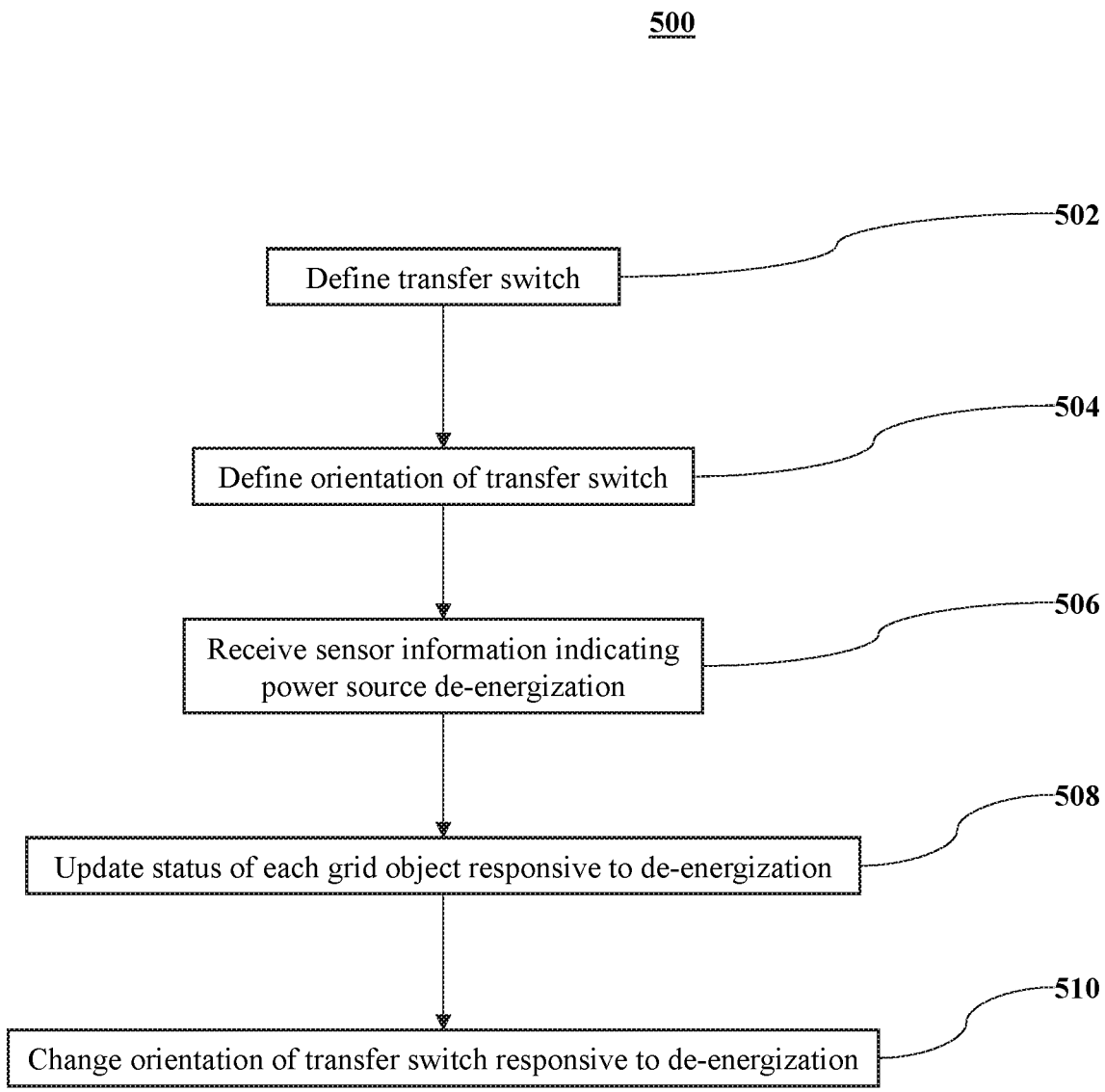
FIG. 5 is a flowchart illustrating a method of defining and re-orienting a transfer switch responsive to de-energization of a power switch according to an embodiment of the invention.

Referring now to FIG. 5, a method 500 of defining and re-orienting a transfer switch responsive to de-energization of a power switch according to an embodiment of the invention is illustrated. The method 500 may comprise defining, by the processor, a transfer switch comprised by the plurality of grid objects 502. A transfer switch may be understood as a grid component that is connected to at least first and second power sources and a power line and is positionable in one of at least two orientations, such that the transfer switch is operable to conduct electrical power from one of the first and second power sources to the power line and, upon de-energization of that power source, is re-positionable in another orientation to conduct electrical power from the other of the first and second power sources to the power line. Accordingly, the method 500 may continue with defining, by the processor, an orientation of the transfer switch, indicating the transfer switch is oriented to conduct electricity from a first power source 504. The method 500 may continue with receiving sensor information from at least one of a sensor associated with the first power source and a sensor associated with the transfer switch indicating the first power source is de-energized 506. The method 500 may continue with updating, by the processor, the status of the transfer switch to indicate re-orientation of the transfer switch to received power from the second power source 508. In some embodiments, the re-orientation of the transfer switch may be confirmed by receiving sensor information from a sensor associated with the transfer switch, with the second power source, or another grid object of power line that can infer the orientation of the transfer switch based on de-energization of the first power source, e.g. a grid object or power line being energized when, with the de-energization of the first power source, the only possible source of electrical power is the second power source, thereby necessarily indicating the successful re-orientation of the transfer switch.

Such re-orientation in the grid status data structure is assumed based on the presumed operation of the transfer switch. In some embodiments, the operation of the transfer switch, i.e. the re-orientation thereof responsive to de-energization of a power source, may be defined in the electrical characteristics thereof in the grid states data structure. For example, where a transfer switch is electrically connected to three power sources, the transfer switch may be programmed to follow a particular progression of re-orientations responsive to de-energization of the power sources.

Figure 6:
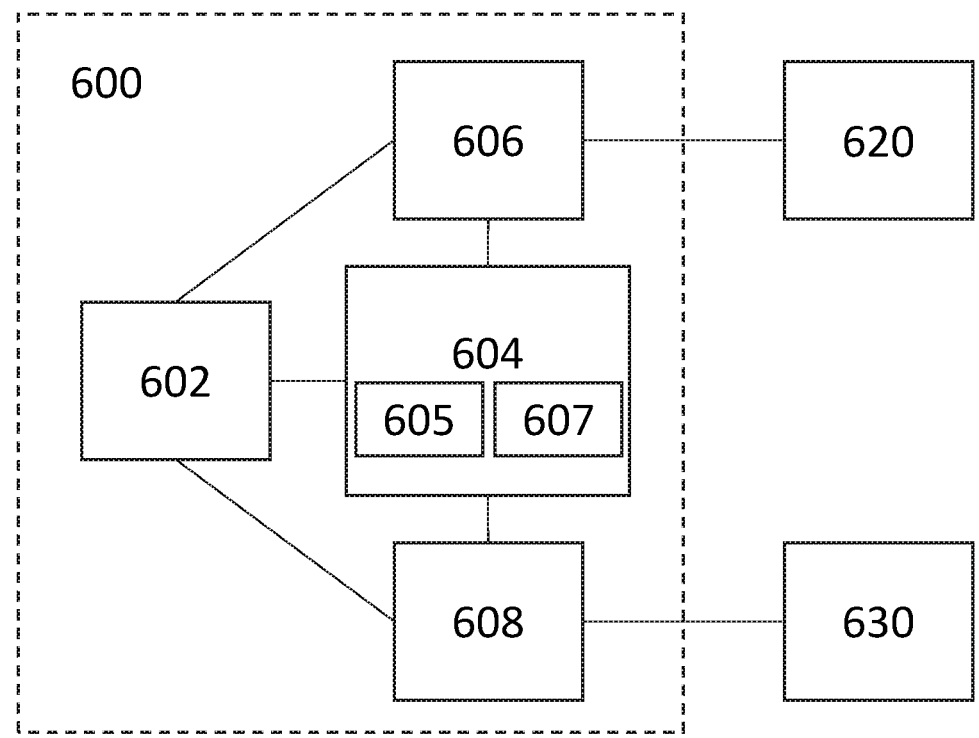
FIG. 6 is a schematic view of a system operable to generate a dynamic representation of an electrical grid according to an embodiment of the invention.

Referring now to FIG. 6, a schematic view of a computerized device 600 operable to generate a dynamic representation of an electrical grid according to an embodiment of the invention is presented. The computerized device 600 may comprise a processor 602, a memory 604, such as a non-volatile storage device, positioned in electrical communication with the processor 602, and a communication device 606 positioned in communication with the processor 602 and, optionally, the memory 604. The processor 602 may be configured and operable to generate and store a grid status data structure file 605 on the memory 604 and update the information comprised thereby as indicated above. The processor 602 may further be configured and operable to generate a display file 607 from the grid status data structure file 605

The communication device 606 may be operable to receive information from a remote device, such as a device operable to send the electrical grid design file, such as a scanner, an e-mail server, a file server, and the like. Accordingly, the communication device 606 may comprise multiple communication devices operable to receive, and potentially send, information in a variety of ways, including Universal Serial Bus (USB), wireless standards such as Bluetooth, Wi-Fi, or any other IEEE 802.xx standard as is known in the art, Ethernet, cellular communication, or any other digital communication standard as is known in the art. The communication device 606 may further be configured and operable to receive sensor information from a plurality of sensors 620 associated with an electrical grid modeled by the computerized device.

The computerized device 600 may further comprise a display adapter 608 positioned in communication with the processor 602 and, optionally, the memory 604. The display adapter 608 may be positioned in communication with a display device 630 and operable to transmit the display file 607 for display on the display device 630.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A computer-implemented method of generating a dynamic representation of an electrical grid comprising:
   receiving an electrical grid design file;
   parsing, by a processor, the electrical grid design file to define a plurality of grid objects comprising a power source and a plurality of power lines;
   generating, by the processor, a grid status data structure comprising a grid coordinate display, the plurality of grid objects, and the plurality of power lines;
   assigning, by the processor, electrical properties to each grid object of the plurality of grid objects;
   defining, by the processor, a location comprising location coordinates and a connection point comprising connection coordinates within the grid coordinate display for each grid object of the plurality of grid objects;
   defining, by the processor, a first end comprising first end coordinates and a second end comprising second end coordinates, collectively power line ends and end coordinates, within the grid coordinate display for each power line of the plurality of power lines;
   defining, by the processor, an electrical connection between grid objects having connection points comprising connection coordinates within a connecting distance threshold, between grid objects and power lines where connection coordinates of a connection point and one of the first end coordinates and the second end coordinates of the power line ends are within the connecting distance threshold, and between power lines wherein end coordinates of two or more power lines are within the connecting distance threshold;
   receiving, via a communication device, association information operable to associate sensors of a plurality of sensors with at least one of a grid object of the plurality of grid objects or a power line of the plurality of power lines;
   defining, by the processor, a transfer switch comprised by the plurality of grid objects, the transfer switch being associated a first power source and a second power source;
   defining, by the processor, an orientation of the transfer switch such that the first power source is a primary power source for the transfer switch and the second power source is a secondary power source for the transfer switch;
   identifying, by the processor, a power source associated with each grid object of the plurality of grid objects;
   receiving, via the communication device, sensor information from the plurality of sensors, defining received sensor information;
   updating, by the processor, a status of each of the plurality of grid objects and the plurality of power lines responsive to the received sensor information, defining an updated grid status data structure;
   generating, by the processor, a display file responsive to the updated grid status data structure, the display file comprising a visual representation of at least a portion of the grid coordinate display, the plurality of grid objects, and the plurality of power lines, the display file being configured to be displayed on a display; and
   transmitting, by a display adapter, the display file to a display device.

2. The method of claim 1 wherein updating the status of each of the plurality of grid objects comprises indicating whether each grid object of the plurality of grid objects is electrified, comprising identifying an unbroken path from an electrified power source to the grid object.

3. The method of claim 1 further comprising defining, by the processor, a power line route between the power line ends for each power line of the plurality of power lines, the power line route comprising information about occupancy of the power line in the grid coordinate display by the power line connecting the power line ends of the power line.

4. The method of claim 3 further comprising:
   identifying, by the processor, a power line having a power line end that is not within the connecting distance threshold of one of a connection point of a grid object or a power line end of another power line, defining an unconnected power line end;

identifying, by the processor, a power line route comprised by a power line of the plurality of power lines where the unconnected power line end is within the connecting distance threshold of the power line route, defining an identified power line route; and defining, by the processor, an electrical connection between the unconnected power line end and the identified power line route, thereby establishing an electrical connection between the respective power lines.

5. The method of claim 4 wherein the unconnected power line end is identified by:

generating, by the processor, a list of all power line ends and connection points comprised by the grid status data structure, defining a plurality of grid connection points;

sequentially comparing, by the processor, each power line end to the grid connection point of the plurality of grid connection points to identify a grid connection point within the connecting distance threshold of the power line end; and for each power line end that is not within the connecting distance threshold of a grid connection point, flagging, by the processor, the power line end as an unconnected power line end.

6. The method of claim 1 further comprising:

identifying, by the processor, a connection point of a grid object that is within the connection distance threshold of connected power line ends of two power lines;

removing, by the processor, the connection between the power line ends of the two power lines; and defining, by the processor, an electrical connection between the connection point of the grid object and each of the power line ends of the two power lines.

7. The method of claim 1 further comprising, upon receiving unrecognizable sensor information from a sensor associated with a grid object, updating, by the processor, the status of the grid object associated with the sensor to indicate the grid object is electrified and to indicate receipt of the unrecognizable sensor information.

8. The method of claim 1 further comprising:

receiving, by the communication device, sensor information from a sensor of the plurality of sensors associated with the power source indicating the power source is de-energized; and updating, by the processor, the status of each grid object of the plurality of grid objects responsive associated with the power source responsive to the de-energization of the power source.

9. The method of claim 8 further comprising:

defining, by the processor, a status of the transfer switch to indicate receiving power from the first power source;

receiving, by the communication device, sensor information from at least one of a sensor associated with the first power source and a sensor associated with the transfer switch indicating the first power source is de-energized; and updating, by the processor, the status of the transfer switch to indicate re-orientation of the transfer switch to receive power from the second power source.

10. The method of claim 1 wherein the electrical grid design file is a scalable vector graphic file.

11. A computer-implemented method of generating a dynamic representation of an electrical grid comprising:

receiving an electrical grid design file;

parsing, by a processor, the electrical grid design file to define a plurality of grid objects comprising a power source and a plurality of power lines;

generating, by the processor, a grid status data structure comprising a grid coordinate display, the plurality of grid objects, and the plurality of power lines;

assigning, by the processor, electrical properties to each grid object of the plurality of grid objects defining, by the processor, a location comprising location coordinates and a connection point comprising connection coordinates within the grid coordinate display for each grid object of the plurality of grid objects;

defining, by the processor, a first end comprising first end coordinates and a second end comprising second end coordinates, collectively power line ends and end coordinates, within the grid coordinate display for each power line of the plurality of power lines;

defining, by the processor, an electrical connection between grid objects having connection points comprising connection coordinates within a connecting distance threshold, between grid objects and power lines where connection coordinates of a connection point and one of the first end coordinates and the second end coordinates of the power line ends are within the connecting distance threshold, and between power lines wherein end coordinates of two or more power lines are within the connecting distance threshold;

identifying, by the processor, a connection point of a grid object that is within the connection distance threshold of connected power line ends of two power lines;

removing, by the processor, the connection between the power line ends of the two power lines;

defining, by the processor, an electrical connection between the connection point of the grid object and each of the power line ends of the two power lines;

defining, by the processor, a power line route between the power line ends for each power line of the plurality of power lines, the power line route comprising information about occupancy of the power line in the grid coordinate display by the power line connecting the power line ends of the power line;

receiving, by a communication device, association information operable to associate sensors of a plurality of sensors with at least one of a grid object of the plurality of grid objects or a power line of the plurality of power lines;

identifying, by the processor, a power source associated with each grid object of the plurality of grid objects;

defining, by the processor, a transfer switch comprised by the plurality of grid objects, the transfer switch being associated a first power source and a second power source;

defining, by the processor, an orientation of the transfer switch such that the first power source is a primary power source for the transfer switch and the second power source is a secondary power source for the transfer switch;

receiving, by the communication device, sensor information from the plurality of sensors, defining received sensor information;

updating, by the processor, a status of each of the plurality of grid objects and the plurality of power lines responsive to the received sensor information, defining an updated grid status data structure, comprising indicating whether each grid object of the plurality of grid objects is electrified, comprising identifying an unbroken path from an electrified power source to the grid object;

generating, by the processor, a display file responsive to the updated grid status data structure, the display file comprising a visual representation of at least a portion of the grid coordinate display, the plurality of grid objects, and the plurality of power lines, the display file being configured to be displayed on a display; and transmitting, by a display adapter device, the display file to a display device.

12. The method of claim 11 further comprising:

identifying, by the processor, a power line having a power line end that is not within the connecting distance threshold of one of a connection point of a grid object or a power line end of another power line, defining an unconnected power line end;

identifying, by the processor, a power line route comprised by a power line of the plurality of power lines where the unconnected power line end is within the connecting distance threshold of the power line route, defining an identified power line route; and defining, by the processor, an electrical connection between the unconnected power line end and the identified power line route, thereby establishing an electrical connection between the respective power lines.

13. The method of claim 12 wherein the unconnected power line end is identified by:

generating, by the processor, a list of all power line ends and connection points comprised by the grid status data structure, defining a plurality of grid connection points;

sequentially comparing, by the processor, each power line end to the grid connection point of the plurality of grid connection points to identify a grid connection point within the connecting distance threshold of the power line end; and for each power line end that is not within the connecting distance threshold of a grid connection point, flagging, by the processor, the power line end as an unconnected power line end.

14. The method of claim 13 further comprising:

receiving, by the communication device, sensor information from a sensor of the plurality of sensors associated with the power source indicating the power source is de-energized; and updating, by the processor, the status of each grid object of the plurality of grid objects responsive associated with the power source responsive to the de-energization of the power source.

15. The method of claim 14 further comprising:

defining, by the processor, a status of the transfer switch to indicate receiving power from the first power source;

receiving, by the communication device, sensor information from at least one of a sensor associated with the first power source and a sensor associated with the transfer switch indicating the first power source is de-energized; and updating, by the processor, the status of the transfer switch to indicate re-orientation of the transfer switch to receive power from the second power source.

16. A system for generating a dynamic representation of an electrical grid comprising:

a processor configured to:

receive an electrical grid design file;

parse the electrical grid design file to define a plurality of grid object comprising a power source and a plurality of power lines;

generate a grid status data structure comprising a grid coordinate display, the plurality of grid objects, and the plurality of power lines;

assign electrical properties to each grid object of the plurality of grid objects;

define a location comprising location coordinates and a connection point comprising connection coordinates within the grid coordinate display for each grid object of the plurality of grid objects;

define a first end comprising first end coordinates and a second end comprising second end coordinates, collectively power line ends and end coordinates, within the grid coordinate display for each power line of the plurality of power lines;

define an electrical connection between grid objects having connection points comprising connection coordinates within a connecting distance threshold, between grid objects and power lines where connection coordinates of a connection point and one of the first end coordinates and the second end coordinates of the power line ends are within the connecting distance threshold, and between power lines wherein end coordinates of two or more power lines are within the connecting distance threshold;

identify a power source associated with each grid object of the plurality of grid objects;

define a transfer switch comprised by the plurality of grid objects, the transfer switch being associated a first power source and a second power source;

define an orientation of the transfer switch such that the first power source is a primary power source for the transfer switch and the second power source is a secondary power source for the transfer switch;

update a status of each of the plurality of grid objects and the plurality of power lines responsive to received sensor information, defining an updated grid status data structure; and generate a display file responsive to the updated grid status data structure, the display file comprising a visual representation of at least a portion of the grid coordinate display, the plurality of grid objects, and the plurality of power lines, the display file being configured to be displayed on a display; and a communication device operably connected to the processor and configured to:

receive association information operable to associate sensors of a plurality of sensors with at least one of a grid object of the plurality of grid objects or a power line of the plurality of power lines; and receive sensor information from the plurality of sensors, defining received sensor information; and a memory operably coupled to each of the processor and the communication device and configured to facilitate storage thereon of the electrical grid design file, the grid status data structure, and the display file, each being editable and retrievable by the processor.

17. The system of claim 16 wherein the processor is further configured to:

identify a connection point of a grid object that is within the connection distance threshold of connected power line ends of two power lines;

break the connection between the power line ends of the two power lines; and define an electrical connection between the connection point of the grid object and each of the power line ends of the two power lines.

18. The system of claim 16 wherein the processor is further configured to:
- define a power line route between the power line ends for each power line of the plurality of power lines, the power line route comprising information about occupancy of the power line in the grid coordinate display by the power line connecting the power line ends of the power line;
- identify a power line having a power line end that is not within the connecting distance threshold of one of a connection point of a grid object or a power line end of another power line, defining an unconnected power line end;
- identify a power line route comprised by a power line of the plurality of power lines where the unconnected power line end is within the connecting distance threshold of the power line route, defining an identified power line route; and
- define an electrical connection between the unconnected power line end and the identified power line route, thereby establishing an electrical connection between the respective power lines.

19. The system of claim 16 wherein
the communication device is further configured to receive sensor information from a sensor of the plurality of sensors associated with the power source indicating the power source is de-energized; and
the processor is further configured to update the status of each grid object of the plurality of grid objects responsive associated with the power source responsive to the de-energization of the power source.

20. The system of claim 19 wherein:
the communication device is further configured to receive sensor information from at least one of a sensor associated with the first power source and a sensor associated with the transfer switch indicating the first power source is de-energized; and
the processor is further configured to:
- define a status of the transfer switch to indicate receiving power from the first power source; and
- update the status of the transfer switch to indicate re-orientation of the transfer switch to receive power from the second power source.

* * * * *

UNITED STATES PATENT AND TRADEMARK OFFICE
CERTIFICATE OF CORRECTION

PATENT NO. : 11,120,170 B2  
APPLICATION NO. : 16/400424  
DATED : September 14, 2021  
INVENTOR(S) : Mitchell Patterson It is certified that error appears in the above-identified patent and that said Letters Patent is hereby corrected as shown below:

On the Title Page

Item (56) OTHER PUBLICATIONS:  
"Pierron, Daniel, Designing a Robotic Complex for Power Line Diagnostics. (Year: 2015)"

Should read:  
"Kuzmenko, Artem D. et al, Designing a Robotic Complex for Power Line Diagnostics. (Year: 2015)"

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*